US012695881B2

(12) United States Patent
Xu et al.

(10) Patent No.: US 12,695,881 B2
(45) Date of Patent: Jul. 28, 2026

(54) ADAPTIVE VIDEO ENHANCEMENT ALGORITHM SELECTION FOR OPTIMAL ADAPTIVE BITRATE STREAMING QUALITY

(71) Applicant: Adeia Guides Inc., San Jose, CA (US)

(72) Inventors: Ning Xu, Irvine, CA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 148 days.

(21) Appl. No.: 18/827,496

(22) Filed: Sep. 6, 2024

(65) Prior Publication Data

US 2026/0075213 A1     Mar. 12, 2026

(51) Int. Cl.
| | |
|---|---|
| *H04N 19/154* | (2014.01) |
| *H04N 19/102* | (2014.01) |
| *H04N 19/136* | (2014.01) |
| *H04N 19/189* | (2014.01) |
| *H04N 19/85* | (2014.01) |

(52) U.S. Cl.
CPC ......... *H04N 19/154* (2014.11); *H04N 19/102* (2014.11); *H04N 19/136* (2014.11); *H04N 19/189* (2014.11); *H04N 19/85* (2014.11)

(58) Field of Classification Search
CPC .. H04N 19/154; H04N 19/102; H04N 19/136; H04N 19/189; H04N 19/85; H04N 19/14; H04N 19/134; H04N 19/59; H04N 19/40
USPC ............................................ 375/240–240.29
See application file for complete search history.

(56) References Cited

U.S. PATENT DOCUMENTS

| | | | | |
|---|---|---|---|---|
| 8,767,825 B1 * | 7/2014 | Wang | ................... | H04N 19/115 |
| | | | | 375/240.1 |
| 2013/0027568 A1 * | 1/2013 | Zou | ........................ | H04N 19/61 |
| | | | | 348/192 |
| 2021/0203951 A1 * | 7/2021 | Kottke | ................. | H04N 19/179 |
| 2023/0104270 A1 * | 4/2023 | Wang | ................... | H04N 19/149 |
| | | | | 375/240.03 |
| 2024/0378694 A1 * | 11/2024 | Nene | ..................... | G06T 3/4053 |

OTHER PUBLICATIONS https://en.wikipedia.org/wiki/Adaptive_bitrate_streaming Retrieved on Nov. 19, 2024.
https://en.wikipedia.org/wiki/Mean_opinion_score Retrieved on Nov. 19, 2024.
https://media.withyoutube.com/ Retrieved on Nov. 19, 2024.
https://vocal.com/video/video-processing-architecture/# Retrieved on Nov. 19, 2024.

(Continued)

*Primary Examiner* — Nathnael Aynalem
(74) *Attorney, Agent, or Firm* — HG LAW LLP

(57) ABSTRACT

Systems and methods are disclosed for training a model which predicts quality scores for a video subject to a video enhancement technique at various encoding parameters and then utilizing the model to determine whether to apply the video enhancement technique. A model is trained to input a feature vector of a video and output a plurality of output quality scores which indicate an expected quality of the input video subject to a video enhancement technique and encoding parameters. Based on the quality scores, the system determines whether to apply the video enhancement technique for each of the quality parameters.

20 Claims, 10 Drawing Sheets

(56)　　　　　References Cited

OTHER PUBLICATIONS

Menon et al., "Toward efficient multi-codec bitrate-ladder estimation for adaptive video streaming," IEEE VCIP, pp. 1-5 (2023).

Reznik, "Toward efficient multi-codec streaming," SMPTE Motion Imaging Journal, 132(4):1-15 (2023).

Tu et al., "UGC-VQA: Benchmarking Blind Video Quality Assessment for User Generated Content," IEEE Transactions on Image Processing 30: 4449-4464 (2021).

* cited by examiner

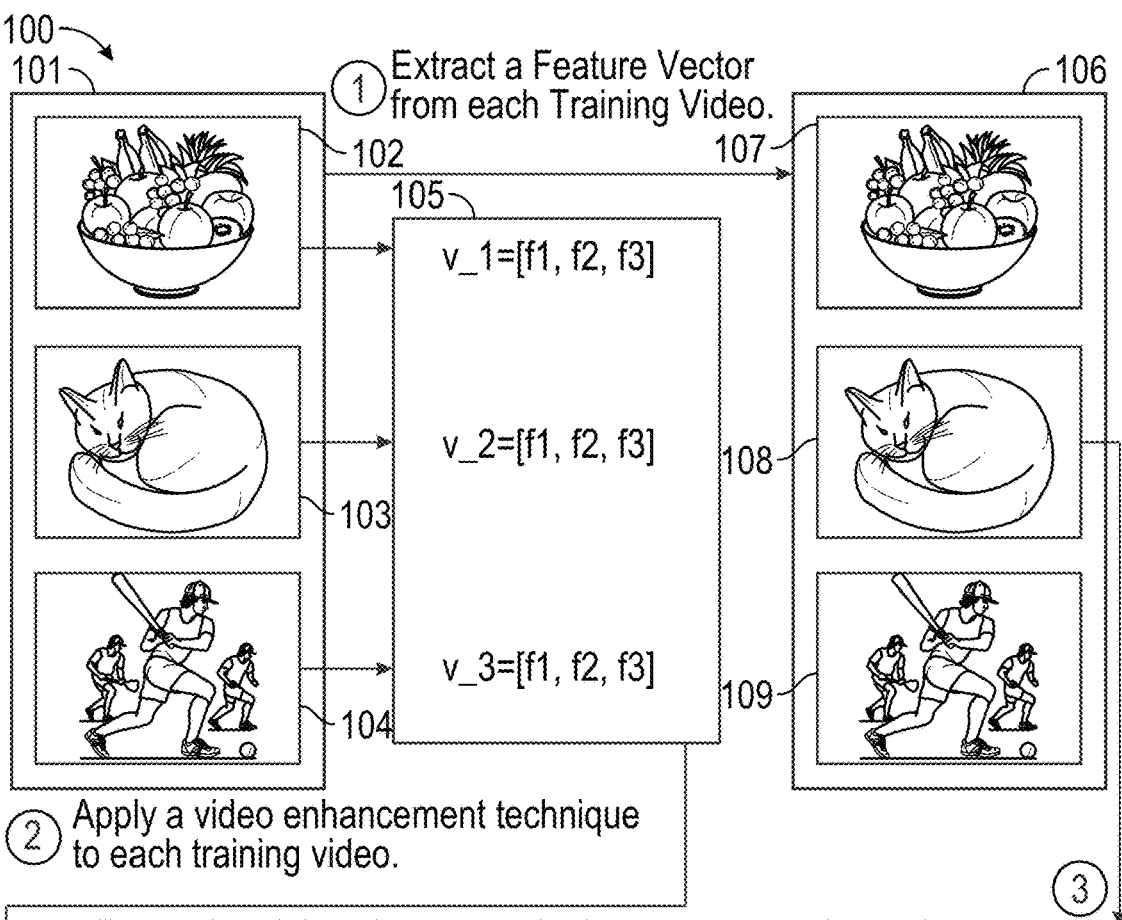

① Extract a Feature Vector from each Training Video.

100
101
102
105

$v\_1=[f1, f2, f3]$ $v\_2=[f1, f2, f3]$ $v\_3=[f1, f2, f3]$ 103
104
106
107
108
109

② Apply a video enhancement technique to each training video.

③

For each training video, encode the enhanced training video into a plurality of resolutions and bitrates. For each pair of resolution and bitrate, calculate a quality score.

110

| | | Bitrate | | | |
|---|---|---|---|---|---|
| | | 500 kbps | 1000 kbps | ⋯ | 2000 kbps |
| Resolution | 480p | 0.1 | 0.5 | ⋯ | 0.7 |
| | 720p | 0.3 | 0.4 | ⋯ | 0.7 |
| | ⋯ | ⋯ | ⋯ | ⋯ | ⋯ |
| | 1080p | 0.5 | 0.9 | ⋯ | 0.8 |

④ Train a model based on each feature vector and the calculated quality scores for each training video.

111

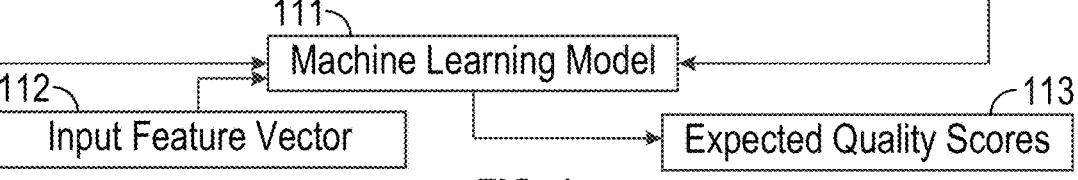

Machine Learning Model

112

Input Feature Vector

113

Expected Quality Scores

FIG. 1

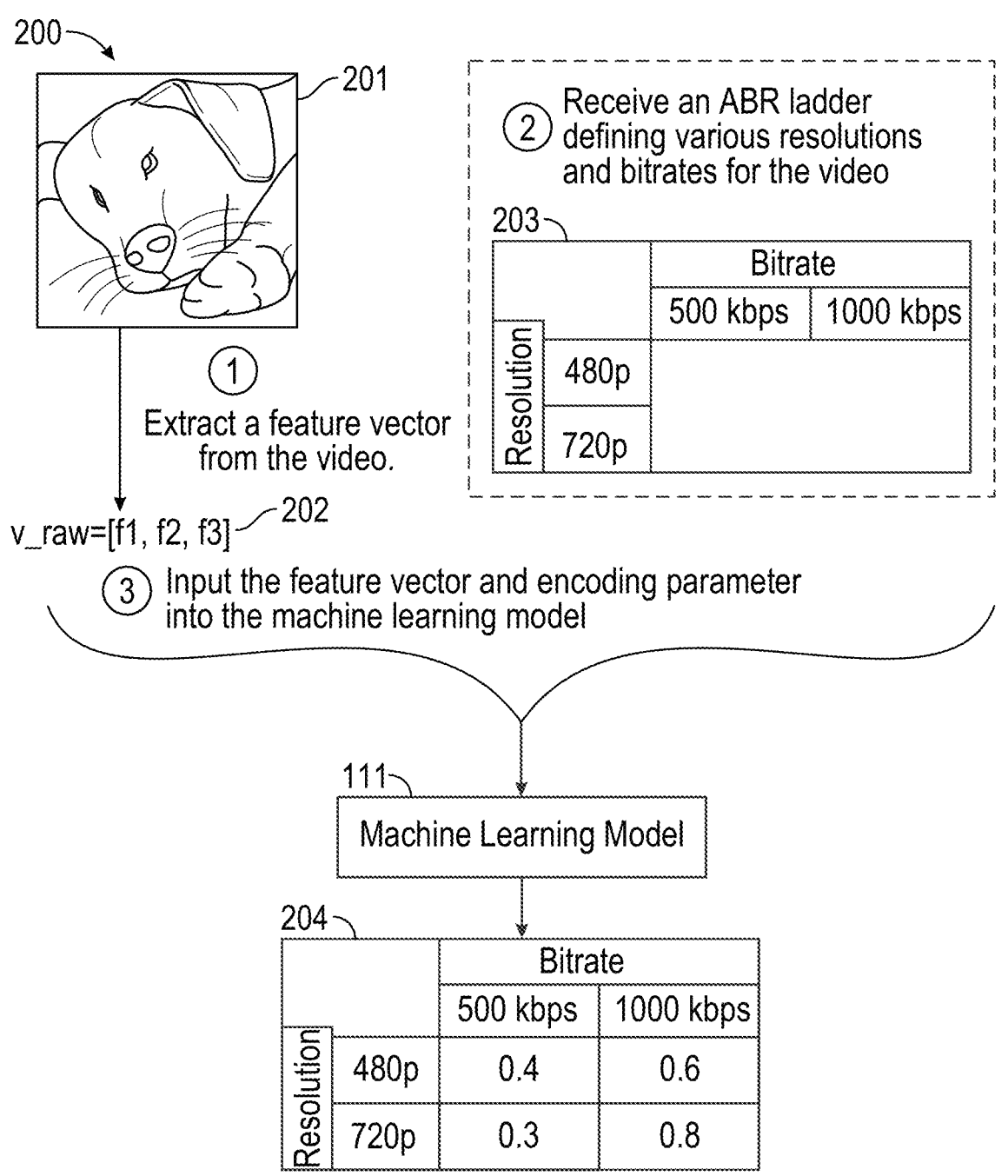

200

201

① Extract a feature vector from the video.

② Receive an ABR ladder defining various resolutions and bitrates for the video

203

| Resolution | Bitrate | |
|---|---|---|
| | 500 kbps | 1000 kbps |
| 480p | | |
| 720p | | | v_raw=[f1, f2, f3] 202

③ Input the feature vector and encoding parameter into the machine learning model

111

Machine Learning Model

204

| Resolution | Bitrate | |
|---|---|---|
| | 500 kbps | 1000 kbps |
| 480p | 0.4 | 0.6 |
| 720p | 0.3 | 0.8 |

④ Receive expected quality scores for each encoding parameter after the enhancement technique is applied ⑤ Determine whether to apply the enhancement technique to the video

FIG. 2

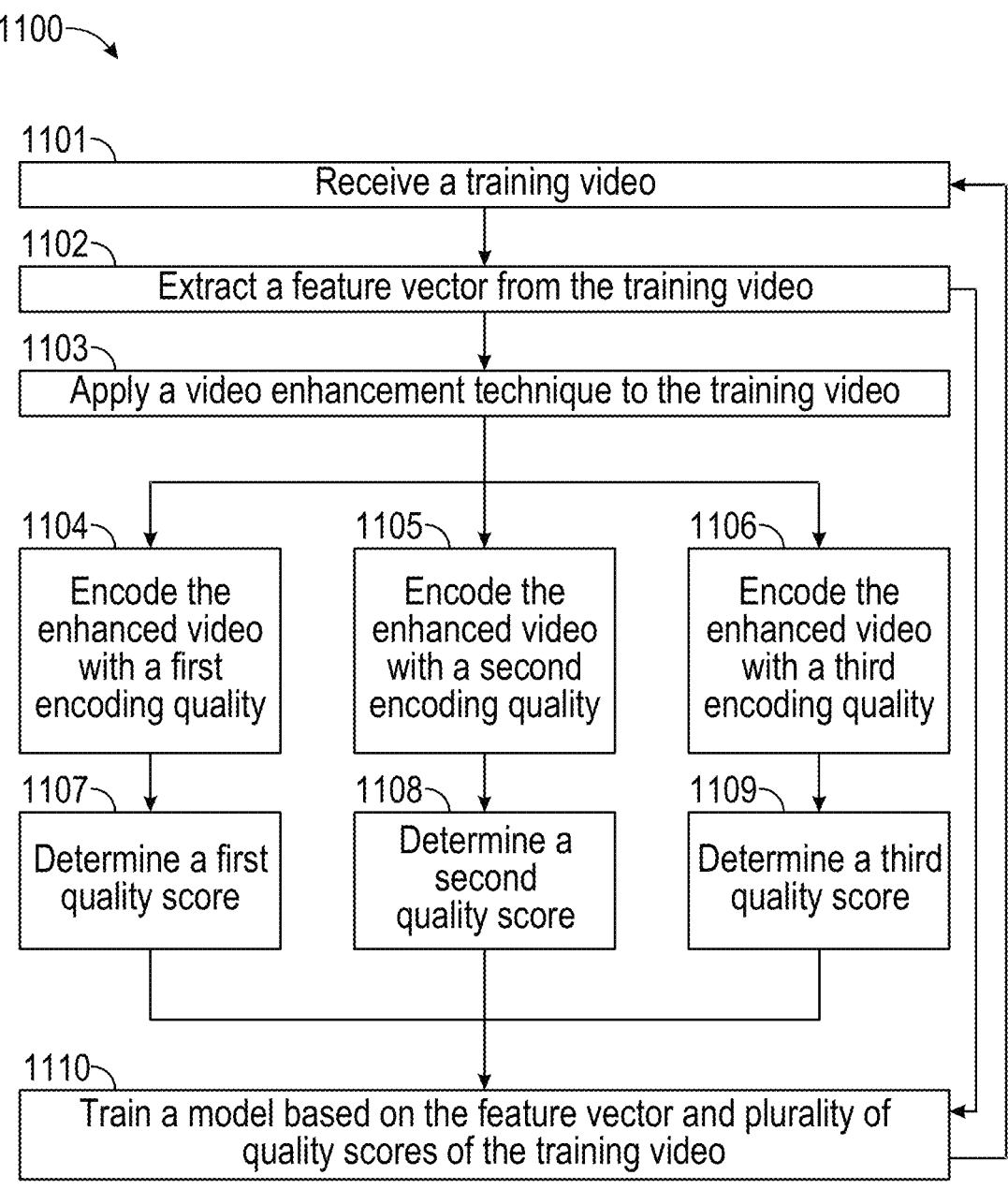

1100

1101 Receive a training video

1102 Extract a feature vector from the training video

1103 Apply a video enhancement technique to the training video

1104 Encode the enhanced video with a first encoding quality

1105 Encode the enhanced video with a second encoding quality

1106 Encode the enhanced video with a third encoding quality

1107 Determine a first quality score

1108 Determine a second quality score

1109 Determine a third quality score

1110 Train a model based on the feature vector and plurality of quality scores of the training video

FIG. 11

ADAPTIVE VIDEO ENHANCEMENT ALGORITHM SELECTION FOR OPTIMAL ADAPTIVE BITRATE STREAMING QUALITY

BACKGROUND

The present disclosure is directed towards systems and methods for optimizing video enhancement algorithm selection for adaptive bitrate (ABR) streaming. Systems and methods are provided herein for training a model which predicts quality scores for a video subject to a video enhancement technique at various encoding parameters and then utilizing the model to determine whether to apply the video enhancement technique or to select between one of multiple video enhancement algorithms.

SUMMARY

In some approaches to operating a user generated content (UGC) video streaming platforms such as YouTube™ Short and TikTok, the process of preparing UGC content for delivery involves two stages: video enhancement or restoration and adaptive bitrate (ABR) streaming preparation, e.g., encoding in different bitrates and resolutions or codecs. Video enhancement, e.g., applying algorithms like noise reduction, color enhancement, super-resolution, etc., is conducted first to improve the quality of the particular video to the best quality possible. Subsequently, the enhanced video undergoes ABR processing, where it is encoded into multiple versions at different resolutions and bitrates to ensure efficient streaming under varying network conditions or encoded using various codecs.

However, this workflow treats video enhancement and bitrate adaptation as separate, sequential processes. The enhancement steps aim to maximize video quality without considering how different enhancements might impact subsequent bitrate-specific encoding. Conversely, the ABR process focuses on encoding efficiency and adapting to network conditions, often without leveraging the potential quality improvements that could be achieved by integrating the choice of enhancement algorithms more closely with the resolution and bitrate decisions. This separation can lead to suboptimal outcomes. For example, a video enhanced solely for high quality at high resolution might not encode effectively at lower bitrates, resulting in poor visual quality such as visible coding artifacts when network conditions require low-bitrate streaming. Moreover, choosing the same enhancement approach for all videos regardless of the target bitrate or viewing conditions can waste computational resources and degrade the user experience under certain streaming conditions. The absence of a coordinated approach limits the potential to maximize visual quality across all bitrates. For example, applying a video enhancement technique such as a color correction prior to encoding may not result in an improvement after encoding. In some instances, the color correction may lead to an improvement for encoding according to some bitrates and resolutions, but not others. By performing the video enhancement technique to all encodings, computing resources are wasted.

There is a clear need for an integrated system that dynamically selects the appropriate video enhancement algorithm or algorithm combinations in conjunction with the resolution for each specific bitrate. Such a system would not only improve visual quality across a spectrum of network conditions but also optimize resource use.

Instead of treating these as separate processes, where video is first enhanced for overall quality and then encoded at various resolutions and bitrates for streaming, systems and methods are disclosed which jointly optimize these steps. The systems and methods dynamically select the best video enhancement algorithm, or multiple video enhancement algorithms, and encoding resolution for each bitrate, ensuring visual quality tailored to network conditions and viewer settings.

The system employs a machine learning model to assess the impact of different enhancement strategies on the visual quality of videos at each bitrate and resolution. This model is to be trained using a diverse dataset of videos processed under varying conditions, with quality assessed through both subjective (viewer feedback) and objective (measured by technical metrics) means. The resulting prediction of visual quality of each combination of enhancement algorithm, resolution, and bitrate, allows for the selection of the optimal setting for each scenario.

Systems and methods are provided for optimizing video enhancement algorithm selection for adaptive bitrate (ABR) streaming. Systems and methods are provided herein for training a model for a video enhancement technique, wherein the model is configured to accept an input feature vector of an input video and output a plurality of output expected quality scores. The feature vector indicates values which describe the inputted video, such as an indication of a video type of the video, an original resolution of the video, an original frame rate of the video, and an original bitrate of the video. The model also receives a selection of encoding parameters, such as bitrate, resolution, and codec. Each output expected quality score of the plurality of output quality scores is indicative of an expected quality of the input video subject to the video enhancement technique and the encoding parameters. In some embodiments, the video enhancement technique may be a combination of multiple video enhancement algorithms. For example, the model may receive a feature vector and a selection of bitrate and resolution pairs. The model will then output an expected quality score if the video is subject to a video enhancement algorithm and a particular bitrate and resolution pair. In some embodiments, the encoding parameters may be multiple parameters from an ABR ladder.

A streaming service may then receive a particular video and extract a feature vector from the particular video. The feature vector is input into the model, which outputs a plurality of expected quality scores, wherein each respective expected quality score of the plurality of expected quality scores is indicative of an expected quality of the particular video subject to the video enhancement technique and a respective encoding parameter of a plurality of encoding parameters. Based on the quality scores, the streaming service determines whether to apply the video enhancement technique to the particular video.

The model allows the streaming service to determine whether a video enhancement technique, or a combination of enhancement techniques, will lead to an improvement after encoding without actually performing the enhancement and encoding, thus reducing the computational resources necessary. In some embodiments, the model may allow the streaming service to determine that the video enhancement technique should be applied to only some encoding parameters of the video. For example, a video may be subject to encoding in resolutions of 480p and 720p and at bitrates of 500 kbps and 1000 kbps. The model may determine that the expected quality score for the video subject to the video enhancement technique is higher than a threshold when subject to encoding in 480p at either 500 kbps or 1000 kbps and 720p at 500 kpbs, but that the expected quality score for the enhanced video encoded in 720p at 1000 kpbs is below the threshold. Therefore, the streaming service will determine that it should apply the video enhancement technique (e.g., noise reduction, super resolution, or color enhancement) when encoding in 480p at either 500 kbps or 1000 kbps and 720p at 500 kpbs, but that it will not apply the video enhancement technique when encoding in 720p at 1000 kpbs. The streaming service will then store the encoded videos, with or without enhancements.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 1 shows a block diagram representing a system for training a model for adaptive selection of a video enhancement technique based on a feature vector and bitrate streaming quality, in accordance with some embodiments of the disclosure;

FIG. 2 shows a block diagram representing a system for implementing a model for adaptive selection of a video enhancement technique, in accordance with some embodiments of the disclosure;

FIG. 11 shows a flowchart of illustrative steps involved in training a model for adaptive selection of a video enhancement technique based on a feature vector and bitrate streaming quality, in accordance with some embodiments of the present disclosure.

DETAILED DESCRIPTION

Figure 3:
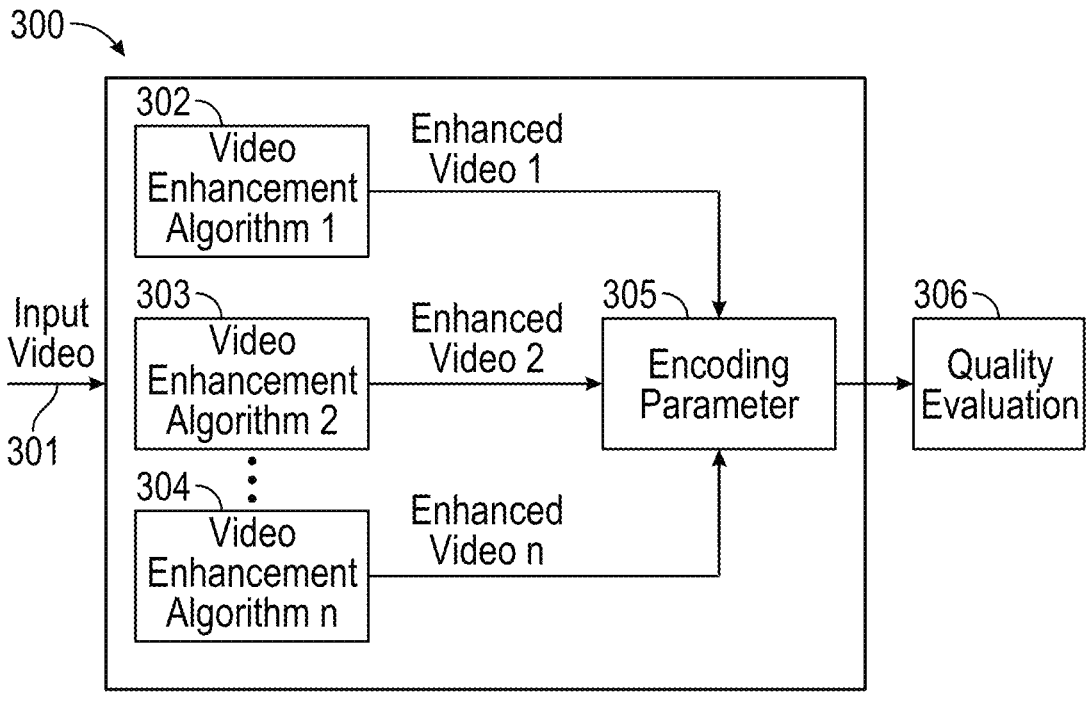
FIG. 3 shows a block diagram representing subjecting a video to various enhancement algorithms and video encoding for evaluation together, in accordance with some embodiments of the disclosure.

FIG. 1 shows a block diagram representing exemplary system 100 for training a model for adaptive selection of a video enhancement technique based on a feature vector and bitrate streaming quality, in accordance with some embodiments of the disclosure.

Exemplary system 100 will train a model using set of training videos 101. Each training video in set of training videos 101 has a particular quality level and set of features which describe it. At step 1, set of feature vectors 105 is extracted from set of training videos 101. Feature vector v_1 is extracted from training video 102, feature vector v_2 is extracted from training video 103, and feature vector v_3 is extracted from training video 104. In some embodiments, this feature vector may contain values that describe the video type, resolution, original bitrate, colors, audio, an/or any other description of the respective video. In some embodiments, the feature vector may include more than one of these descriptions of the respective video. In some embodiments, this feature vector extraction may be performed using a deep learning model. In some embodiments, the feature vector may be extracted for only a segment or scene of the respective video.

At step 2, a video enhancement technique is applied to each training video in set of training videos 101 to create set of enhanced training videos 106. Enhanced training videos 107, 108, and 109 are an enhanced version of training videos 102, 103, and 104 respectively. In some embodiments, the video enhancement technique may be an enhancement algorithm such as noise reduction, color enhancement, super resolution, and/or any other video enhancement algorithm. In some embodiments, the video enhancement technique may include a combination of different video enhancement algorithms. In some approaches, this combination may be order specific. For example, a first video enhancement technique may apply a color enhancement algorithm and then a noise resolution algorithm while a second video enhancement technique may apply a noise reduction algorithm and then a color enhancement algorithm.

At step 3, each training video is encoded according to a set of encoding parameters to create versions of the enhanced video. In some embodiments, these encoding parameters may be various bitrates and resolutions according to an ABR scheme. In some embodiments, these encoding parameters may be various codecs. In some embodiments, the system may receive the encoding parameters as a matrix which defines every combination of bitrate and resolution within the ABR ladder. In some embodiments, the system may receive individual encoding parameters for the training video and append the encoding parameter to the feature vector to be inputted into the model.

Each version of the enhanced video, defined by the various encoding parameters, is evaluated for a quality estimation. In some embodiments, the quality assessment may be performed by a pre-trained deep-learning-based video quality assessment (VQA) model. In some embodiments, system 100 may use the same VQA model to estimate the quality of the video before it is subjected to the video enhancement and encoding parameters in order to create a baseline comparison. In some embodiments, the quality analysis will determine an estimated human subjective perception of video quality. This will create a mean opinion score (MOS), where a higher score indicates better perceptual quality. Table 110 shows the MOS for enhanced training video 108 for each encoding parameter. In some embodiments, the MOS may range on a scale from 0 to 1, where 0 indicates a low quality while 1 indicates a high quality. In some embodiments, the MOS may range on a scale from 0 to 10, where 0 indicates a low quality while 10 indicates a high quality. For example, enhanced training video 108, when subjected to encoding at resolution 480p and bitrate 500 kbps, has an estimated quality score of 0.1, on a scale from 0 to 1. In some embodiments, this low of a quality score may indicate that the video is unwatchable.

At step 4, machine learning model 111 is trained on each feature vector of set of feature vectors 105 and the calculated quality scores from table 110 and from other enhanced training videos. Machine learning model 111 will now accept an input of feature vector 112 and output expected quality scores 113 without requiring the system to apply the video enhancement algorithm to the video associated with feature vector 112 and encode the video according to the encoding parameters.

In some embodiments, system 100 may be repeated for a second video enhancement technique to create a second model.

FIG. 2 shows a block diagram representing system 200 for implementing a model for adaptive selection of a video enhancement technique, in accordance with some embodiments of the disclosure.

At step 1, feature vector 202 is extracted from inputted video 201. In some embodiments, feature vector 202 is extracted in the same way that feature vector 105. In some embodiments, feature vector 202 may contain values that describe the video type, resolution, original bitrate, colors, audio, an/or any other description of the video. In some embodiments, feature vector 202 extraction may be performed using a deep learning model. In some embodiments, feature vector 202 may be extracted for only a segment or scene of the video. In some embodiments, the video type may indicate a particular encoding, an original quality, a genre, characters, or themes of the video.

At optional step 2, in some embodiments, system 200 receives ABR ladder 203 which defines various resolutions and bitrates which the video may be encoded in. In some embodiments, system 200 may instead receive a single encoding parameter, such as a resolution and bitrate pair or a codec. In these embodiments, system 200 may append the encoding parameter to feature vector 202 before applying machine learning model 111.

At step 3, feature vector 202 and the encoding parameters are input into machine learning model 111. At step 4, machine learning model 111 outputs expected quality scores of the video if it is subjected to the video enhancement technique for each encoding parameter. These expected quality scores are shown in table 204.

At step 5, system 200 determines whether to apply the video enhancement algorithm to video 201. This decision is accomplished without requiring the system to apply the video enhancement algorithm to video 201 and instead relies on the expected quality scores in table 204. In some embodiments, the system may determine whether to apply the enhancement technique by comparing the expected quality score to a threshold. For example, if the threshold is 0.5, then the video will have the video enhancement technique applied when encoded in 480p at 1000 kbps and 720p at 1000 kbps, but not when the video is encoded in 480p at 500 kbps and 720p at 500 kbps. In some embodiments, the threshold may be determined based on estimated quality of the video subject to a different video enhancement technique. In some embodiments, the system may determine whether to apply the enhancement technique by comparing the expected quality score to a quality score of the video when not subject to the video enhancement. In these embodiments, the initial quality score is determined by a VQA model and used as a reference or threshold quality. For example, if the VQA model determines that the initial video has a quality score of 0.2, then the video will have the video enhancement technique applied for all encoding parameters since all expected quality scores in table 204 are greater than 0.2. However, if the VQA model determines that the initial video has a quality score of 0.4, then the video will have the video enhancement technique applied when encoded in 480p at 1000 kbps and 720p at 1000 kbps. The video will not have the video enhancement technique applied when the video is encoded in 480p at 500 kbps and 720p at 500 kbps since the enhancement will not lead to an increase in quality. This ensures that the video only receives the video enhancement technique when it will actually improve the quality of the video and resources are not wasted when the video enhancement will not lead to an increase in quality.

In some embodiments, the system may determine whether to apply the enhancement technique by comparing expected quality score table 204 to a second table of quality scores for the same bitrate and resolution pairs. In some approaches, the two quality scores for each bitrate and resolution pair are compared and the higher quality is selected. In some approaches, the second table of quality scores may be expected quality scores for a different video enhancement technique being applied. In some approaches, the second table of quality scores may be initial quality scores of the original video after encoding at each configuration.

FIG. 3 shows a block diagram representing subjecting a video to various enhancement algorithms and video encoding for evaluation together, in accordance with some embodiments of the disclosure.

In some embodiments, a system will have multiple competing video-enhancing algorithms, each of which may perform well for certain video types but not for others. System 300 evaluates multiple video enhancement algorithms to determine which is best for each encoding parameter.

In some embodiments, system 300 will receive input video 301 and subject it to each of video enhancement algorithm 302, 303, and 304 separately, thus generating a set of enhanced videos. Each enhanced video is encoded according to encoding parameter 305. The quality of each enhanced and encoded video then subject to quality evaluation 306. In some embodiments, system 300 may determine that video enhancement algorithm 302 results in a higher quality for encoding parameter 305 than either video enhancement algorithm 303 or video enhancement algorithm 304. Thus, quality evaluation 306 occurs when both the video enhancement algorithm and encoding have been performed. This allows system 300 to evaluate the video enhancement algorithm for the particular encoding algorithm.

In some embodiments, system 300 may create one of the training videos in set of training videos 101 discussed in connection with FIG. 1.

Figure 4:
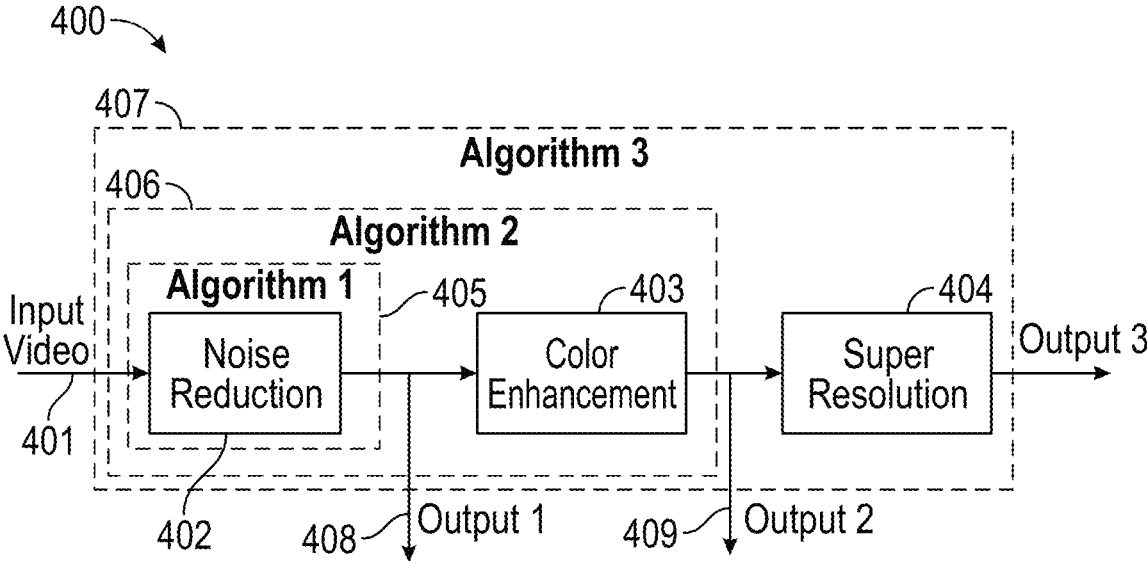
FIG. 4 shows a block diagram representing various types of video enhancement algorithms, in accordance with some embodiments of the disclosure.

FIG. 4 shows a block diagram representing various types of video enhancement algorithms, in accordance with some embodiments of the disclosure.

Series of video enhancement algorithms 400 contains a series of video enhancement algorithms including noise reduction 402, color enhancement 403, and super resolution 404. In some embodiments, input video 401 may be subject to a video enhancement technique which may be any of noise reduction 402, color enhancement 403, or super resolution 404, individually or combination. In some embodiments, this video enhancement technique may be the video enhancement technique of FIG. 1. In some embodiments, this video enhancement technique may be any of video enhancement algorithms 302, 303, or 304 discussed in connection with FIG. 3.

A video enhancement technique may be an algorithm consisting of a portion of Series of video enhancement algorithms 400. In some embodiments, the video enhancement technique may be algorithm 1 which consists only of noise reduction 405. In some embodiments, the video enhancement technique may be algorithm 2 which consists of noise reduction 405 and color enhancement 403. In some embodiments, the video enhancement technique may be algorithm 3 which consists of noise reduction 405, color enhancement 403, and super resolution 404. Therefore, each step of series of video enhancement algorithms 400 may be considered a video enhancement algorithm individually to be compared and selected between. In some embodiments, video enhancement algorithms can be combined in different ways and different orders.

Figure 5:
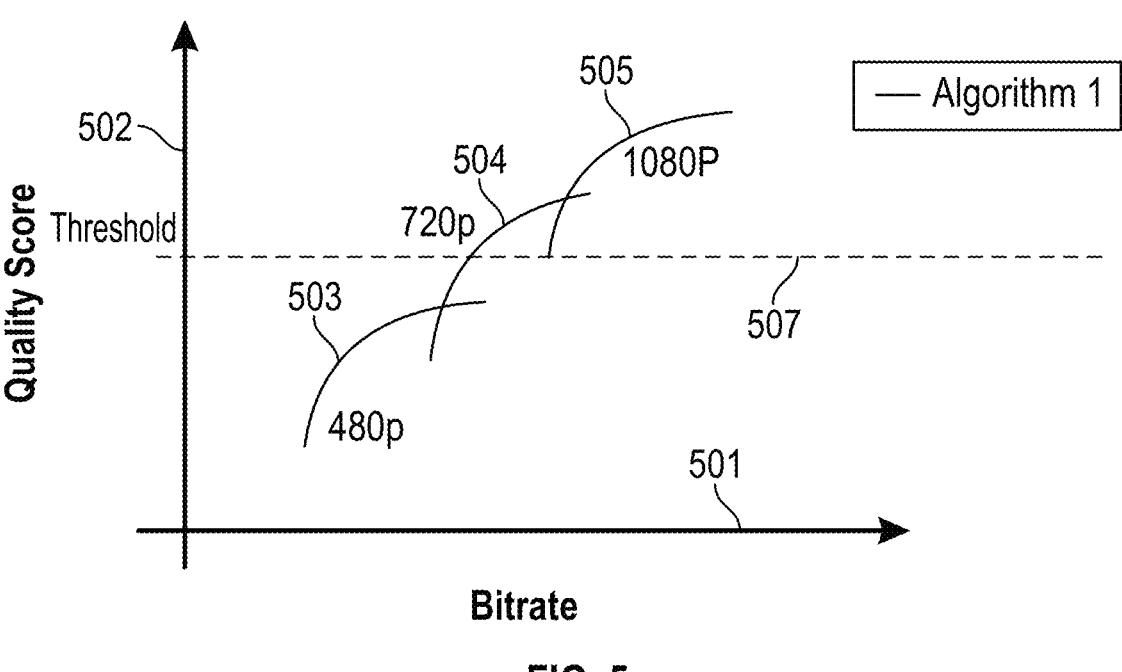
FIG. 5 shows a visual representation of the output of a model for adaptive selection of a video enhancement technique and encoding parameter, in accordance with some embodiments of the disclosure.

FIG. 5 shows graph 500 of the output of a model for adaptive selection of a video enhancement technique and encoding parameters including bitrate and resolution, in accordance with some embodiments of the disclosure. In some embodiments, graph 500 may be a graph of the output of machine learning algorithm 111 discussed in connection with FIG. 2.

Graph 500 has x-axis 501 which represents the bitrate y-axis 502 which represents the quality score of a video subject to a video enhancement technique and encoding parameters. In some embodiments, the quality scores may be the expected quality scores in table 204 output by model 111 discussed in connection with FIG. 2.

Graph 500 shows quality-resolution curves 503, 504, and 505. For each of quality-resolution curves 503, 504, and 505, the resolution is held constant. Quality-resolution curve 503 represents a video subject to video enhancement algorithm 1 and encoded in resolution 480p. Quality-resolution curve 504 represents a video subject to video enhancement algorithm 1 and encoded in resolution 720p. Quality-resolution curve 505 represents a video subject to video enhancement algorithm 1 and encoded in resolution 1080p. Each quality-resolution curve can be generated by sampling a series of bitrate points and using interpolation to obtain the entire curve.

Graph 500 shows that, for algorithm 1, the expected quality score increases with the bitrate for all resolutions. However, the video enhancement may be applied only when the estimated quality score is above threshold 507. For example, all bitrates result in an expected quality score above the threshold when the enhanced video is subject to encoding in 1080p resolution. However, all bitrates result in an expected quality score below the threshold when the enhanced video is subject to encoding in 480p resolution. Therefore, the video enhancement algorithm will be applied to all encodings with 1080p but none for 480p. Only some higher bitrates result in an expected quality score above the threshold when the enhanced video is subject to encoding in 720p resolution. Therefore, for those bitrates the video enhancement algorithm will be applied to the video, but the video enhancement algorithm will not be applied to the video for the lower bitrates.

In some embodiments, the threshold may be determined based on an initial quality estimation of the video when not subject to the video enhancement algorithm 1. In some embodiments, the threshold may be determined based on the computing resources available to a video enhancing circuitry and the computing resources needed to perform the video enhancement algorithm.

Figure 6:
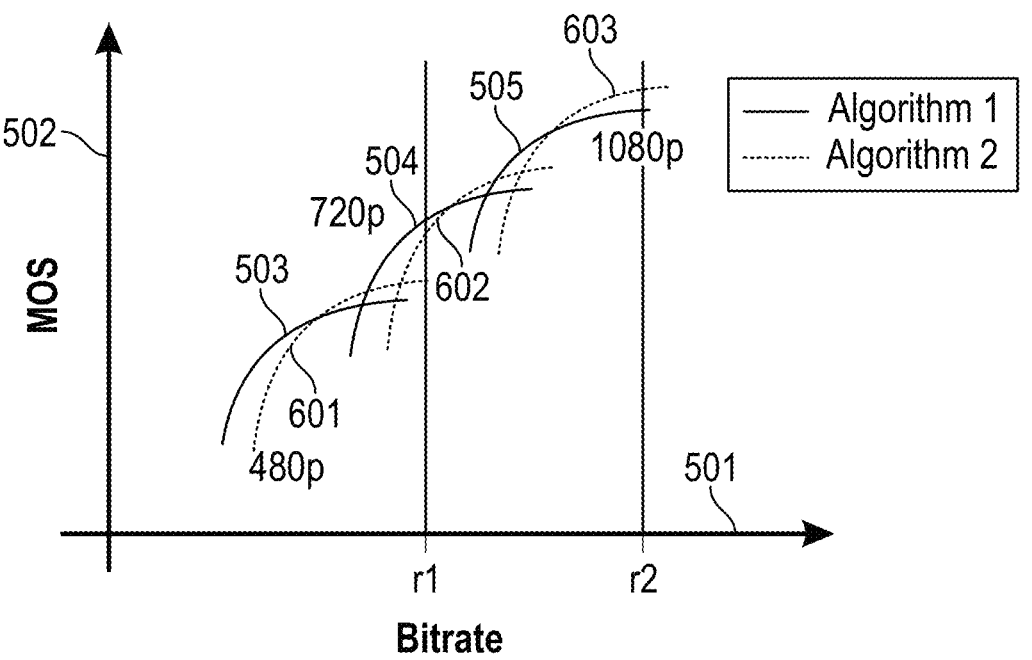
FIG. 6 shows a visual representation of the output of two models for adaptive selection of video enhancement techniques and encoding parameter, in accordance with some embodiments of the disclosure.

FIG. 6 shows graph 600 of the output of two models for adaptive selection of video enhancement techniques and encoding parameter, in accordance with some embodiments of the disclosure.

Graph 600 shows quality-resolution curves 503, 504, and 505 for video enhancement algorithm 1 and quality-resolution curves 601, 602, and 603 for video enhancement algorithm 2. Quality-resolution curve 601 represents a video subject to video enhancement algorithm 2 and encoded in resolution 480p. Quality-resolution curve 603 represents a video subject to video enhancement algorithm 2 and encoded in resolution 720p. Quality-resolution curve 603 represents a video subject to video enhancement algorithm 2 and encoded in resolution 1080p. Each quality-resolution curve can be generated by sampling a series of bitrate points and using interpolation to obtain the entire curve.

In some embodiments, the estimated quality score may be used to determine which of video enhancement algorithm 1 or video enhancement algorithm 2 and which resolution should be applied to each bitrate. For example, for the video encoded at bitrate r1, the expected quality score is higher for algorithm 1 at 720p than algorithm 2. Therefore, the video encoded at bitrate r1 and resolution 720p will have video enhancement algorithm 1 applied. For example, for the video encoded at bitrate r2, the expected quality score is higher for algorithm 2 at 1080p than algorithm 1. Therefore, the video encoded at bitrate r2 and resolution 1080p will have video enhancement algorithm 2 applied.

Figure 7:
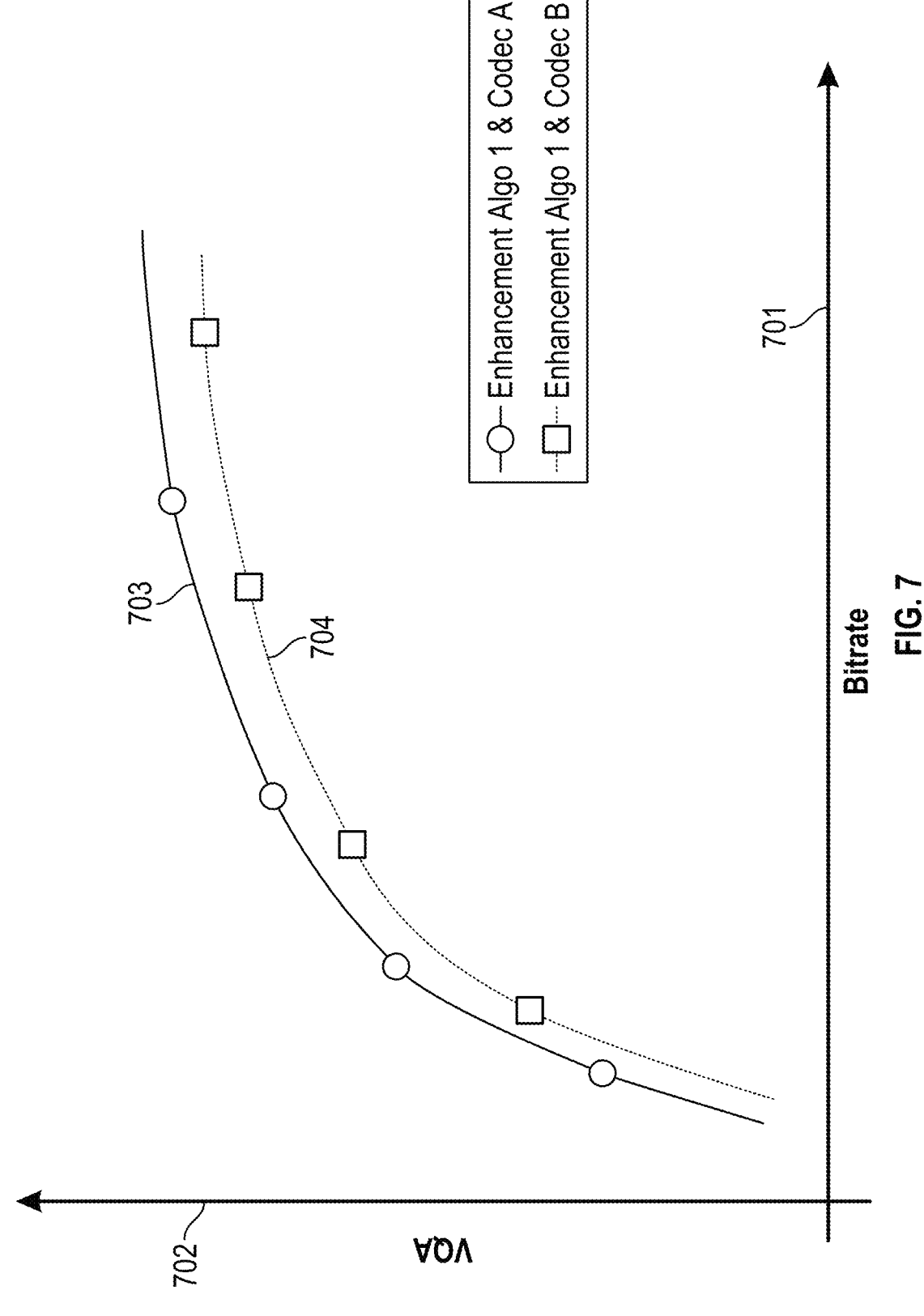
FIG. 7 shows a visual representation of the output of a model for adaptive selection of a video enhancement technique and codec, in accordance with some embodiments of the disclosure.

FIG. 7 shows a visual representation of the output of a model for adaptive selection of a video enhancement technique and codec, in accordance with some embodiments of the disclosure. In some embodiments, graph 700 may be a graph of the output of machine learning algorithm 111 discussed in connection with FIG. 2.

In ABR streaming systems, each codec requires its own bitrate ladder. For example, AVC and high efficiency video coding (HEVC) may have distinct bitrate ladders. Seamlessly switching between AVC and HEVC streams leads to better video quality and reducing streaming costs. However, some system can only decode either AVC or HEVC streams and therefore will not switch to another codec during a streaming session. Different codecs exhibit different coding artifacts depending on the content and bitrates and therefore will impact the choice of video enhancement algorithm for each target bitrate in an intended ABR ladder.

Graph 700 has x-axis 701 which represents the bitrate y-axis 702 which represents the quality score of a video subject to a video enhancement technique and encoding parameters. In some embodiments, the quality scores may be the expected quality scores in table 204 output by model 111 discussed in connection with FIG. 2.

Graph 700 shows quality-codec curves 703 and 704. For each of quality-codec curves 703 and 704, the codec is held constant. Quality-codec curve 703 represents a video subject to video enhancement algorithm 1 and encoded in codec A.

Quality-codec curve 704 represents a video subject to video enhancement algorithm 1 and encoded in codec B. For each codec, the quality-codec curve is an aggregation convex hull of multiple curves from encoding of various resolutions at different bitrates. With only one enhancement algorithm in this case, there are four bitrate points for devices that support codec B only. On the other hand, for devices that support switching between codecs A and B, there are more bitrates to choose from, i.e., a more granular ABR streaming experience.

Figure 8:
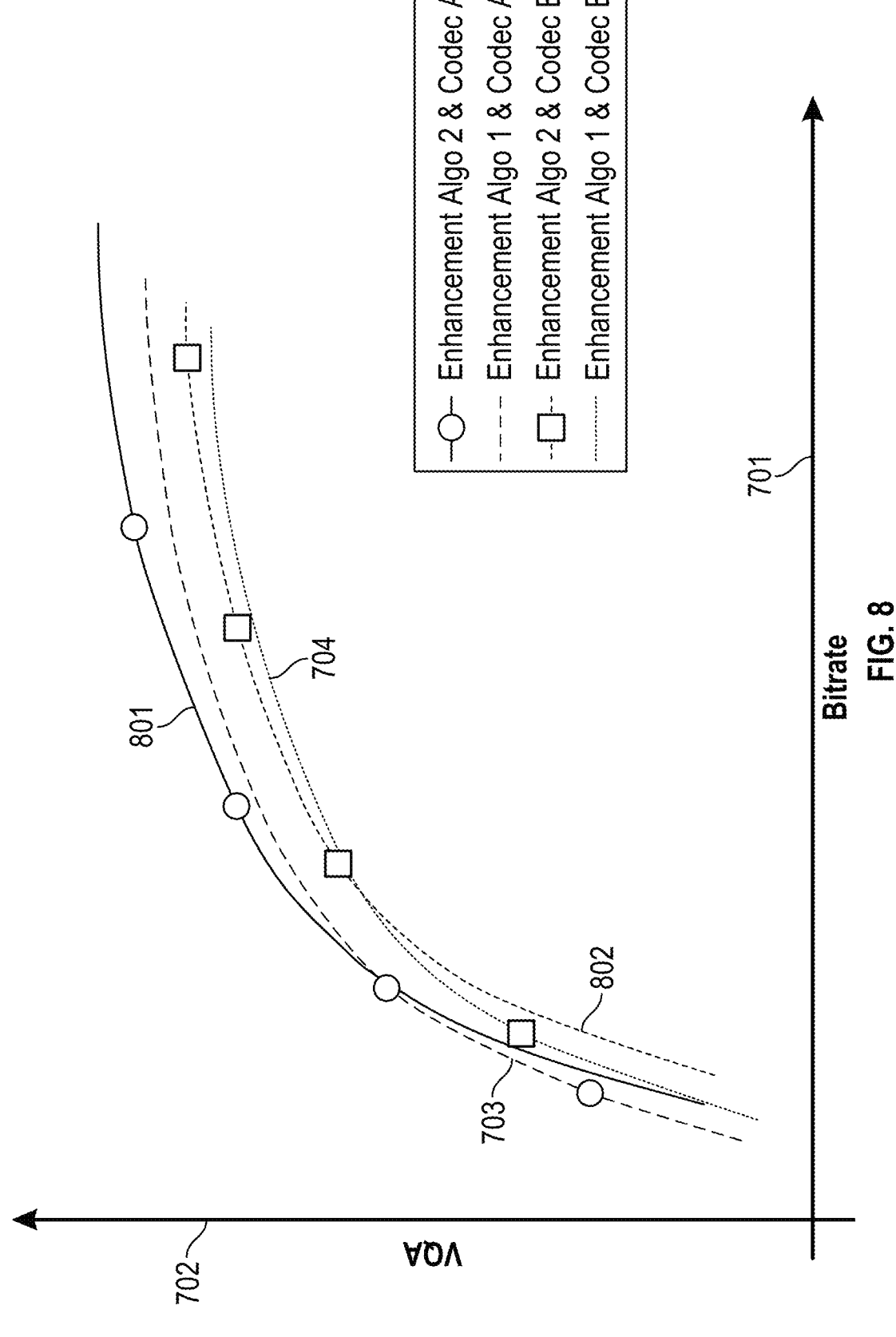
FIG. 8 shows a visual representation of the output of two models for adaptive selection of video enhancement techniques and codec, in accordance with some embodiments of the disclosure.

FIG. 8 shows a visual representation of the output of two models for adaptive selection of video enhancement techniques and codec, in accordance with some embodiments of the disclosure.

Graph 800 shows quality-codec curves 703 and 704 of a video subject to video enhancement algorithm 1 and quality-codec curves 801 and 802 of a video subject to video enhancement algorithm 2. For each of quality-codec curves 801 and 802, the codec is held constant. Quality-codec curve 801 represents a video subject to video enhancement algorithm 2 and encoded in codec A. Quality-codec curve 802 represents a video subject to video enhancement algorithm 2 and encoded in codec B. Each of the four bitrate points optimized for codec A and codec B will observe adjustment. The ultimate choices depend on the performance of each enhancement algorithm that is optimized for each resolution and bitrate.

Figure 9:
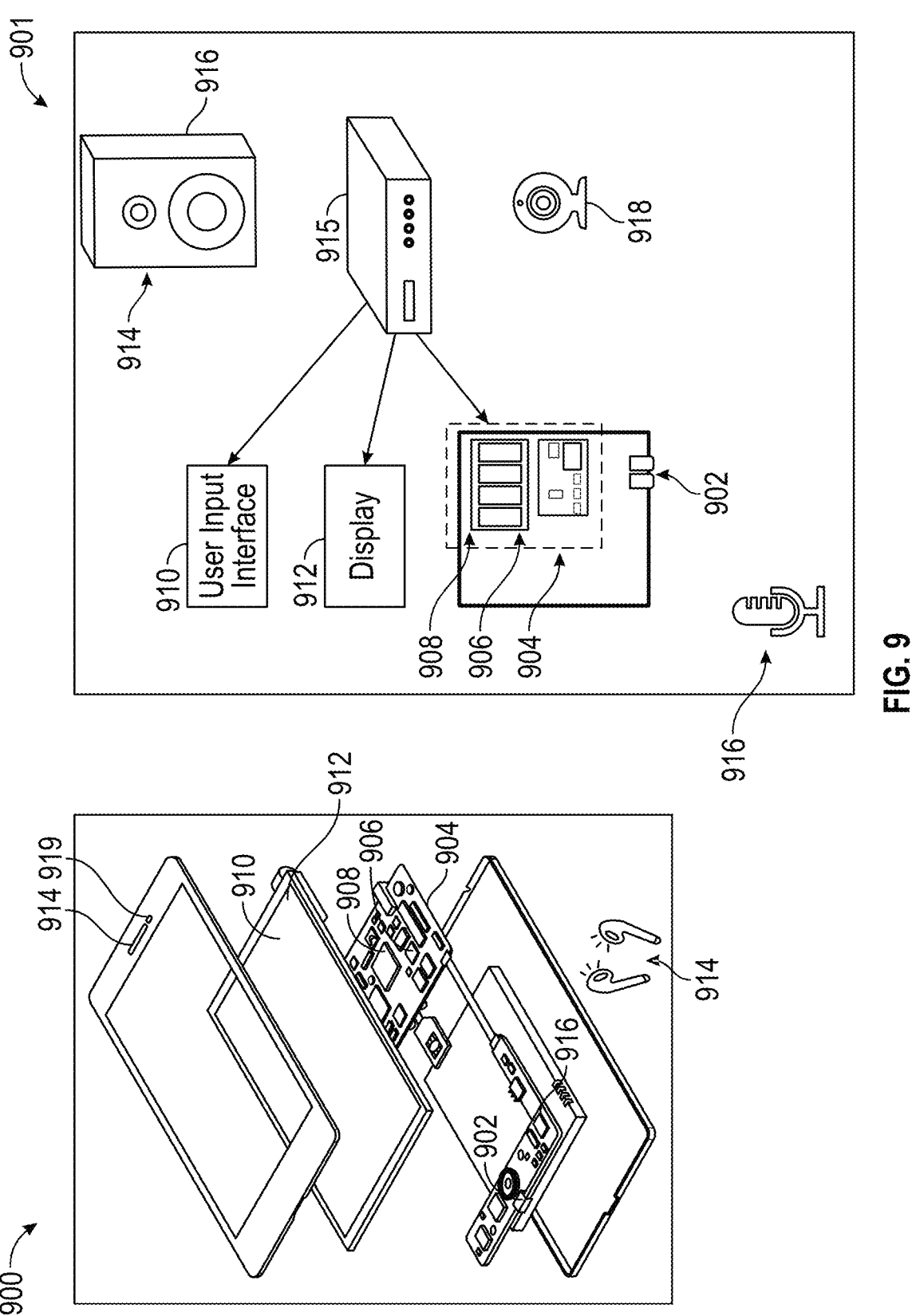
FIGS. 9-10 describe exemplary devices, systems, servers, and related hardware for streaming content in a low latency system, in accordance with some embodiments of the present disclosure.
Figure 10:
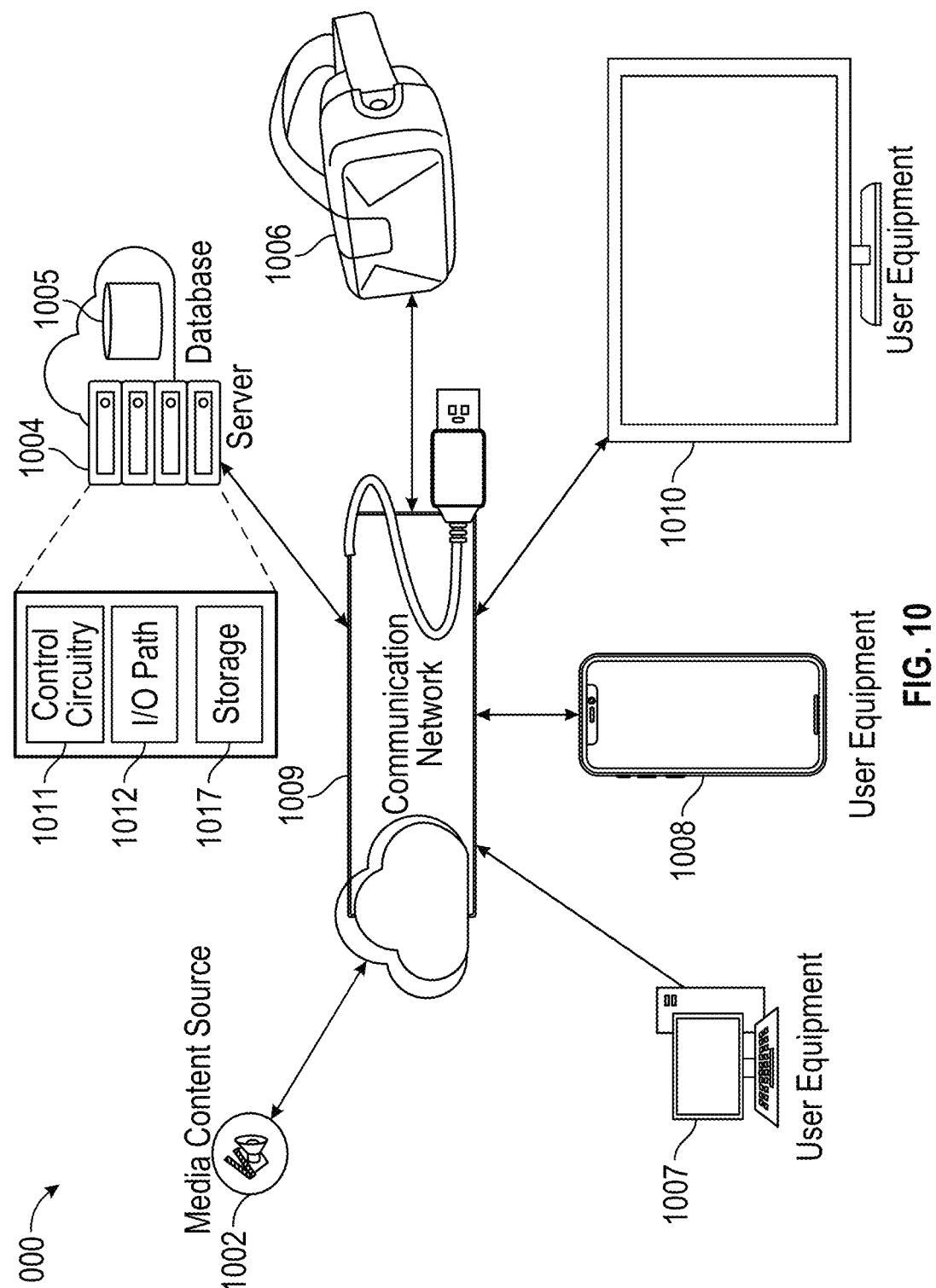

FIGS. 9-10 describe illustrative devices, systems, servers, and related hardware for providing audio from a live event to a user, in accordance with some embodiments of the present disclosure. FIG. 9 shows generalized embodiments of illustrative user equipment 900 and 901, which may correspond to user equipment which video 201 of FIG. 2 is displayed on. For example, user equipment 900 may be a smartphone device, a tablet, a near-eye display device, an XR device, or any other suitable device capable of participating in a XR environment, e.g., locally or over a communication network. In another example, user equipment 901 may be a user television equipment system or device. User equipment 901 may include set-top box 916. Set-top box 916 may be communicatively connected to microphone 917, audio output equipment (e.g., speaker or headphones 914), and display 912. In some embodiments, microphone 917 may receive audio corresponding to a voice of a live conference participant and/or ambient audio data during a video conference. In some embodiments, display 912 may be a television display or a computer display. In some embodiments, set-top box 916 may be communicatively connected to user input interface 910. In some embodiments, user input interface 910 may be a remote-control device. Set-top box 916 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment are discussed below in connection with FIG. 10. In some embodiments, device 900 may comprise any suitable number of sensors (e.g., gyroscope or gyrometer, or accelerometer, etc.), and/or a GPS module (e.g., in communication with one or more servers and/or cell towers and/or satellites) to ascertain a location of device 900. In some embodiments, device 900 comprises a rechargeable battery that is configured to provide power to the components of the device.

Each one of user equipment 900 and user equipment 901 may receive content and data via input/output (I/O) path 902. I/O path 902 may provide content (e.g., broadcast programming, on-demand programming, internet content, content available over a local area network (LAN) or wide area network (WAN), and/or other content) and data to control circuitry 904, which may comprise processing circuitry 907 and storage 908. Control circuitry 904 may be used to send and receive commands, requests, and other suitable data using I/O path 902, which may comprise I/O circuitry. I/O path 902 may connect control circuitry 904 (and specifically processing circuitry 907) to one or more communications paths (described below). I/O functions may be provided by one or more of these communications paths, but are shown as a single path in FIG. 9 to avoid overcomplicating the drawing. While set-top box 916 is shown in FIG. 9 for illustration, any suitable computing device having processing circuitry, control circuitry, and storage may be used in accordance with the present disclosure. For example, set-top box 916 may be replaced by, or complemented by, a personal computer (e.g., a notebook, a laptop, a desktop), a smartphone (e.g., device 900), an XR device, a tablet, a network-based server hosting a user-accessible client device, a non-user-owned device, any other suitable device, or any combination thereof.

Control circuitry 904 may be based on any suitable control circuitry such as processing circuitry 907. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 904 executes instructions for the media application stored in memory (e.g., storage 908). Specifically, control circuitry 904 may be instructed by the media application to perform the functions discussed above and below. In some implementations, processing or actions performed by control circuitry 904 may be based on instructions received from the media application.

In client/server-based embodiments, control circuitry 904 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 9, the instructions may be stored in storage 908, and executed by control circuitry 904 of a device 900.

In some embodiments, the media application may be a client/server application where only the client application resides on device 900, and a server application resides on an external server (e.g., server 1004 and/or media content source 1002). For example, the media application may be implemented partially as a client application on control circuitry 904 of device 900 and partially on server 1004 as a server application running on control circuitry 1011. Server 1004 may be a part of a local area network with one or more of devices 900, 901 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 1004 and/or an edge computing device), referred to as "the cloud." Device 900 may be a cloud client that relies on the cloud computing capabilities from server 1004 to generate personalized engagement options in a VR environment. The client application may instruct control circuitry 904 to generate personalized engagement options in a VR environment.

Control circuitry 904 may include communications circuitry suitable for communicating with a server, edge computing systems and devices, a table or database server, or other networks or servers. The instructions for carrying out the above mentioned functionality may be stored on a server (which is described in more detail in connection with FIG. 10). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (which is described in more detail in connection with FIG. 10). In addition, communications circuitry may include circuitry that enables peer-to-peer communication of user equipment, or communication of user equipment in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media application data described above. Nonvolatile memory may also be used (e.g., to launch a boot-up routine and other instructions). Cloud-based storage, described in relation to FIG. 9, may be used to supplement storage 908 or instead of storage 908.

Control circuitry 904 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 904 may also include scaler circuitry for upconverting and downconverting content into the preferred output format of user equipment 900. Control circuitry 904 may also include digital-to-analog converter circuitry and analog-to-digital converter circuitry for converting between digital and analog signals. The tuning and encoding circuitry may be used by user equipment 900, 901 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 900, the tuning and encoding circuitry (including multiple tuners) may be associated with storage 908.

Control circuitry 904 may receive instruction from a user by way of user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of each one of user equipment 900 and user equipment 901. For example, display 912 may be a touchscreen or touch-sensitive display. In such circumstances, user input interface 910 may be integrated with or combined with display 912. In some embodiments, user input interface 910 includes a remote-control device having one or more microphones, buttons, keypads, any other components configured to receive user input or combinations thereof. For example, user input interface 910 may include a handheld remote-control device having an alphanumeric keypad and option buttons. In a further example, user input interface 910 may include a handheld remote-control device having a microphone and control circuitry configured to receive and identify voice commands and transmit information to set-top box 916.

Audio output equipment 914 may be integrated with or combined with display 912. Display 912 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 912. Audio output equipment 914 may be provided as integrated with other elements of each one of device 900 and device 901 or may be stand-alone units. An audio component of videos and other content displayed on display 912 may be played through speakers (or headphones) of audio output equipment 914. In some embodiments, audio may be distributed to a receiver (not shown), which processes and outputs the audio via speakers of audio output equipment 914. In some embodiments, for example, control circuitry 904 is configured to provide audio cues to a user, or other audio feedback to a user, using speakers of audio output equipment 914. There may be a separate microphone 917 or audio output equipment 914 may include a microphone configured to receive audio input such as voice commands or speech. For example, a user may speak letters or words that are received by the microphone and converted to text by control circuitry 904. In a further example, a user may voice commands that are received by a microphone and recognized by control circuitry 904. Camera 918 may be any suitable video camera integrated with the equipment or externally connected. Camera 918 may be a digital camera comprising a charge-coupled device (CCD) and/or a complementary metal-oxide semiconductor (CMOS) image sensor. Camera 918 may be an analog camera that converts to digital images via a video card.

The media application may be implemented using any suitable architecture. For example, it may be a stand-alone application wholly implemented on each one of user equipment 900 and user equipment 901. In such an approach, instructions of the application may be stored locally (e.g., in storage 908), and data for use by the application is downloaded on a periodic basis (e.g., from an out-of-band feed, from an internet resource, or using another suitable approach). Control circuitry 904 may retrieve instructions of the application from storage 908 and process the instructions to provide video conferencing functionality and generate any of the displays discussed herein. Based on the processed instructions, control circuitry 904 may determine what action to perform when input is received from user input interface 910. For example, movement of a cursor on a display up/down may be indicated by the processed instructions when user input interface 910 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 904 may allow a user to provide user profile information or may automatically compile user profile information. For example, control circuitry 904 may access and monitor network data, video data, audio data, processing data, participation data from a conference participant profile. Control circuitry 904 may obtain all or part of other user profiles that are related to a particular user (e.g., via social media networks), and/or obtain information about the user from other sources that control circuitry 904 may access. As a result, a user can be provided with a unified experience across the user's different devices.

In some embodiments, the media application is a client/server-based application. Data for use by a thick or thin client implemented on each one of user equipment 900 and user equipment 901 may be retrieved on-demand by issuing requests to a server remote to each one of user equipment 900 and user equipment 901. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on device 900. This way, the processing of the instructions is performed remotely by the server while the resulting displays (e.g., that may include text, a keyboard, or other visuals) are provided locally on device 900. Device 900 may receive inputs from the user via input interface 910 and transmit those inputs to the remote server for processing and generating the corresponding displays. For example, device 900 may transmit a communication to the remote server indicating that an up/down button was selected via input interface 910. The remote server may process instructions in accordance with that input and generate a display of the application corresponding to the input (e.g., a display that moves a cursor up/down). The generated display is then transmitted to device 900 for presentation to the user.

In some embodiments, the media application may be downloaded and interpreted or otherwise run by an interpreter or virtual machine (run by control circuitry 904). In some embodiments, the media application may be encoded in the ETV Binary Interchange Format (EBIF), received by control circuitry 904 as part of a suitable feed, and interpreted by a user agent running on control circuitry 904. For example, the media application may be an EBIF application. In some embodiments, the media application may be defined by a series of JAVA-based files that are received and run by a local virtual machine or other suitable middleware executed by control circuitry 904. In some of such embodiments (e.g., those employing MPEG-2, MPEG-4, HEVC or any other suitable digital media encoding schemes), the media application may be, for example, encoded and transmitted in an MPEG-2 object carousel with the MPEG audio and video packets of a program.

As shown in FIG. 10, user equipment 1006, 1007, 1008, 1010 (which may correspond to, user equipment which video 201 of FIG. 2 is displayed on) may be coupled to communication network 1009. Communication network 1009 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 1009) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 10 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 1002-11x, etc.), or other short-range communication via wired or wireless paths. The user equipment may also communicate with each other directly through an indirect path via communication network 1009.

System 1000 may comprise media content source 1002, one or more servers 1004, and/or one or more edge computing devices. In some embodiments, the media application may be executed at one or more of control circuitry 1011 of server 1004 (and/or control circuitry of user equipment 1006, 1007, 1008, 1010 and/or control circuitry of one or more edge computing devices). In some embodiments, the media content source and/or server 1004 may be configured to host or otherwise facilitate video communication sessions between user equipment 1006, 1007, 1008, 1010 and/or any other suitable user equipment, and/or host or otherwise be in communication (e.g., over network 1009) with one or more social network services.

In some embodiments, server 1004 may include control circuitry 1011 and storage 1014 (e.g., RAM, ROM, Hard Disk, Removable Disk, etc.). Storage 1014 may store one or more databases. Server 1004 may also include an I/O path 1012. I/O path 412 may provide video conferencing data, device information, or other data, over a local area network (LAN) or wide area network (WAN), and/or other content and data to control circuitry 1011, which may include processing circuitry, and storage 1014. Control circuitry 1011 may be used to send and receive commands, requests, and other suitable data using I/O path 1012, which may comprise I/O circuitry. I/O path 1012 may connect control circuitry 1011 (and specifically control circuitry) to one or more communications paths.

Control circuitry 1011 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 411 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 1011 executes instructions for an emulation system application stored in memory (e.g., the storage 1014). Memory may be an electronic storage device provided as storage 414 that is part of control circuitry 1011.

FIG. 11 shows a flowchart of illustrative steps involved in training a model for adaptive selection of a video enhancement technique based on a feature vector and encoding parameter in accordance with some embodiments of the present disclosure. In some embodiments, the model may be machine learning model 111 discussed in connection with FIGS. 1 and 2. In some embodiments, the server may be server 1004 discussed in connection with FIG. 10.

At 1101, the server receives a training video for training a machine learning algorithm. At 1002, the server extracts a feature vector from the training video. In some embodiments, this feature vector may be any of the feature vectors from set of feature vectors 105 discussed in connection with FIG. 1. At 1003, the server applies a video enhancement technique to the training video. In some embodiments, the video enhancement technique may be any of video enhancement techniques 302, 303, and 304 discussed in connection with FIG. 3. In some embodiments, the video enhancement technique may be any of video enhancement algorithms 402, 403, or 404 discussed in connection with FIG. 4, or any combination thereof.

At 1104, the server encodes the enhanced video with a first encoding parameter. In some embodiments, the first encoding parameter may be any resolution and bitrate pair in table 110 discussed in connection with FIG. 1. In some embodiments, the first encoding parameter may be codec A or codec B, discussed in connection with FIG. 7. At 1105, the server encodes the enhanced video with a second encoding parameter. In some embodiments, the second encoding parameter may be any resolution and bitrate pair in table 110 discussed in connection with FIG. 1. In some embodiments, the second encoding parameter may be codec A or codec B, discussed in connection with FIG. 7. At 1106, the server encodes the enhanced video with a third encoding parameter. In some embodiments, the third encoding parameter may be any resolution and bitrate pair in table 110 discussed in connection with FIG. 1. In some embodiments, the third encoding parameter may be codec A or codec B, discussed in connection with FIG. 7.

At 1107, the server determines a first quality score of the enhanced video subject to the first encoding parameter. At 1108, the server determines a second quality score of the enhanced video subject to the second encoding parameter. At 1109, the server determines a third quality score of the enhanced video subject to the third encoding parameter. In some embodiments, the quality scores may be one of the quality scores in table 110, discussed in connection with FIG. 1. In some embodiments, the quality scores may be a quality score represented on graph 500, discussed in connection with FIG. 5. In some embodiments, the quality scores may be a quality score represented on graph 600, discussed in connection with FIG. 6. In some embodiments, the quality scores may be a quality score represented on graph 700, discussed in connection with FIG. 7. In some embodiments, the quality scores may be a quality score represented on graph 800, discussed in connection with FIG. 8.

Figure 12:
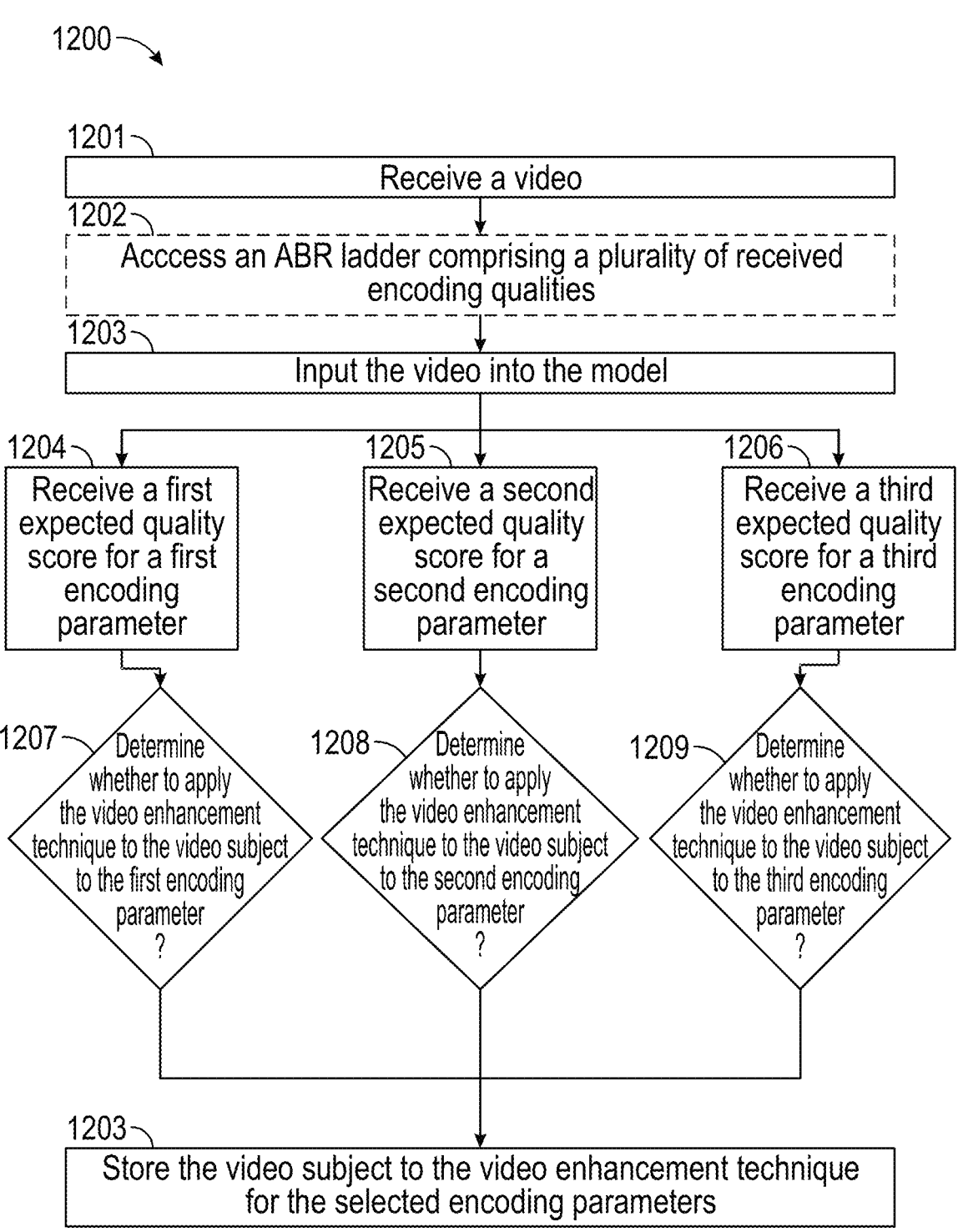
FIG. 12 shows a flowchart of illustrative steps involved in implementing a model for adaptive selection of a video enhancement technique, in accordance with some embodiments of the present disclosure.

FIG. 12 shows a flowchart of illustrative steps involved in implementing a model for adaptive selection of a video enhancement technique, in accordance with some embodiments of the present disclosure. In some embodiments, the model may be machine learning model 111 discussed in connection with FIGS. 1 and 2. In some embodiments, the server may be server 1004 discussed in connection with FIG. 10. In some embodiments, the model may be the machine learning model trained in connection with FIG. 11.

At 1201, the server receives a video to be evaluated by a machine learning algorithm. At optional step 1202, the server receives an ABR ladder with a plurality of encoding qualities. In some embodiments, the encoding qualities may be any resolution and bitrate pair in table 203 discussed in connection with FIG. 2. In some embodiments, the third encoding qualities may be codec A or codec B, discussed in connection with FIG. 7. In some embodiments, the server may input the accessed encoding parameters into the model. In some embodiments, the machine learning model may be preset with the encoding parameters.

At 1203, the server inputs the video into the machine learning model. In some embodiments, the server extracts a feature vector from the video. In these embodiments, this feature vector may be feature vector 202 discussed in connection with FIG. 2. In some approaches, the server may input the feature vector instead of the video into the machine learning model.

At 1204, the server receives a first expected quality score from the model for a first encoding quality. At 1205, the server receives a second expected quality score from the model for a second encoding quality. At 1206, the server receives a third expected quality score from the model for a third encoding quality. In some embodiments, the quality scores may be one of the quality scores in table 204, discussed in connection with FIG. 2. In some embodiments, the quality scores may be a quality score represented on graph 500, discussed in connection with FIG. 5. In some embodiments, the quality scores may be a quality score represented on graph 600, discussed in connection with FIG. 6. In some embodiments, the quality scores may be a quality score represented on graph 700, discussed in connection with FIG. 7. In some embodiments, the quality scores may be a quality score represented on graph 800, discussed in connection with FIG. 8.

At 1207, the server determines whether to apply the video enhancement technique to the video subject to the first encoding parameter. At 1208, the server determines whether to apply the video enhancement technique to the video subject to the second encoding parameter. At 1209, the server determines whether to apply the video enhancement technique to the video subject to the third encoding parameter. In some embodiments, this determination is made in the same manner as discussed in step 5, discussed in connection with FIG. 5. At 1210, the server stores the versions of the video subject to the enhancement for the selected encoding parameters. In some embodiments, the system stores the video not subject to the video enhancement for the versions encoded in the other encoding parameters.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

training at least one model for a video enhancement technique, wherein the model is configured to:

process an input feature vector of an input video; and output a plurality of expected quality scores, wherein each output expected quality score of the plurality of expected quality scores is indicative of an expected quality of the input video subject to the video enhancement technique and a respective input encoding parameter of a plurality of input encoding parameters;

receiving a particular video;

extracting a particular feature vector from the particular video;

inputting the particular feature vector into the at least one trained model;

receiving, from the at least one trained model, a particular plurality of output quality scores wherein each respective output quality score of the particular plurality of output quality scores is indicative of an expected quality of the particular video subject to the video enhancement technique and a respective encoding parameter of a plurality of encoding parameters; and applying the video enhancement technique to the particular video to create an enhanced particular video;

encoding the enhanced particular video to create versions of the particular video, wherein each version is encoded according to a respective encoding parameter of a subset of the plurality of received encoding parameters, wherein the subset of the plurality of received encoding parameters is determined based on the particular plurality of output quality scores;

storing the plurality of versions of the particular video.

2. The method of claim 1, further comprising:

based on the particular plurality of output quality scores, determining not to apply the video enhancement technique to versions of the particular video that are to be encoded according to encoding parameters not in the subset of the plurality of encoding parameters;

encoding the particular video to create the versions of the particular video wherein each version is encoded according to a respective encoding parameter of the encoding parameters not in the subset of the plurality of encoding parameters;

storing the plurality of versions of the particular video.

3. The method of claim 1 wherein the training the at least one trained model comprises:

preparing a training dataset based on a plurality of training videos by, for each respective training video of the plurality of training videos:

extracting a respective training feature vector of the respective training video;

applying the video enhancement technique to the respective training video to create a respective enhanced training video;

encoding the respective enhanced training video into a respective plurality of encoded enhanced training videos; and determining a respective plurality of training quality scores, wherein each training quality score of the plurality of training quality scores corresponds to a respective encoded enhanced training video of the respective plurality of encoded enhanced training videos.

4. The method of claim 1 wherein each encoding parameter of a plurality of encoding parameters comprises one or more of a bitrate, a resolution, and a codec.

5. The method of claim 1 wherein the video enhancement technique comprises one or more of a noise-reduction algorithm, a color enhancement algorithm, and a super resolution algorithm applied in any order.

6. The method of claim 1 wherein the feature vector comprises a vector indicating one or more of an indication of a video type of the particular video, an original resolution of the particular video, and an original bitrate of the particular video.

7. The method of claim 1 wherein determining the subset of the plurality of received encoding parameters based on the particular plurality of output quality scores comprises:

determining that a subset of quality scores of the plurality of quality scores is above a threshold, wherein each respective quality score in the subset of quality scores corresponds to a respective encoding parameter in the subset of the plurality of encoding parameters.

8. The method of claim 1, wherein determining the subset of the plurality of received encoding parameters based on the particular plurality of output quality scores comprises, for each respective encoding parameter of the plurality of encoding parameters: determining that the respective output quality score corresponding to the encoding parameter is higher than an initial quality score, wherein the initial quality score is indicative of a quality of the particular video encoded with the respective encoding parameter.

9. The method of claim 1 wherein the particular video is a first segment of a full video.

10. The method of claim 1, wherein the at least one trained model is a first model, the video enhancement technique is a first video enhancement technique, the plurality of expected quality scores is a first plurality of expected quality scores, the method further comprising:

training a second model for a second video enhancement technique, wherein the second model is configured to:

process the input feature vector of the input video; and output a second plurality of expected quality scores, wherein each expected quality scores of the second plurality of expected quality scores is indicative of an expected quality of the input video subject to the second video enhancement technique and a respective input encoding parameter of a plurality of input encoding parameters.

11. The method of claim 10, wherein the particular plurality of output quality scores is a first particular plurality of output quality scores, the method further comprising:

inputting the particular feature vector into the second model;

receiving, from the second trained model, a second particular plurality of output quality scores, wherein each respective output quality score of the second particular plurality of output quality scores is indicative of an expected quality of the particular video subject to the second video enhancement technique and a respective encoding parameter of a plurality of encoding parameters;

based on the first particular plurality of output quality scores and the second particular plurality of output quality scores, determining to apply the first video enhancement technique and to not apply the second to apply the video enhancement technique to versions of the particular video that are to be encoded according to the subset of the plurality of encoding parameters.

12. A method comprising:

control circuitry configured to train at least one model for a video enhancement technique, wherein the model is configured to:

process an input feature vector of an input video; and output a plurality of expected quality scores, wherein each output expected quality score of the plurality of expected quality scores is indicative of an expected quality of the input video subject to the video enhancement technique and a respective input encoding parameter of a plurality of input encoding parameters;

input/output circuitry configured to receive a particular video;

the control circuitry configured to:

extract a particular feature vector from the particular video;

input the particular feature vector into the at least one trained model;

receive, from the at least one trained model, a particular plurality of output quality scores wherein each respective output quality score of the particular plurality of output quality scores is indicative of an expected quality of the particular video subject to the video enhancement technique and a respective encoding parameter of a plurality of encoding parameters; and apply the video enhancement technique to the particular video to create an enhanced particular video;

encode the enhanced particular video to create versions of the particular video, wherein each version is encoded according to a respective encoding parameter of a subset of the plurality of received encoding parameters, wherein the subset of the plurality of received encoding parameters is determined based on the particular plurality of output quality scores;

store the plurality of versions of the particular video.

13. The system of claim 12, wherein the control circuitry is further configured to:

based on the particular plurality of output quality scores, determine not to apply the video enhancement technique to versions of the particular video that are to be encoded according to encoding parameters not in the subset of the plurality of encoding parameters;

encode the particular video to create the versions of the particular video wherein each version is encoded according to a respective encoding parameter of the encoding parameters not in the subset of the plurality of encoding parameters;

store the plurality of versions of the particular video.

14. The system of claim 12, wherein the control circuitry is further configured to train the at least one trained model by:

preparing a training dataset based on a plurality of training videos by, for each respective training video of the plurality of training videos:

extracting a respective training feature vector of the respective training video;

applying the video enhancement technique to the respective training video to create a respective enhanced training video;

encoding the respective enhanced training video into a respective plurality of encoded enhanced training videos; and determining a respective plurality of training quality scores, wherein each training quality score of the plurality of training quality scores corresponds to a respective encoded enhanced training video of the respective plurality of encoded enhanced training videos.

15. The system of claim 12, wherein each encoding parameter of a plurality of encoding parameters comprises one or more of a bitrate, a resolution, and a codec.

16. The system of claim 12, wherein the video enhancement technique comprises one or more of a noise-reduction algorithm, a color enhancement algorithm, and a super resolution algorithm applied in any order.

17. The system of claim 12, wherein the feature vector comprises a vector indicating one or more of an indication of a video type of the particular video, an original resolution of the particular video, and an original bitrate of the particular video.

18. The system of claim 12, wherein the control circuitry determines the subset of the plurality of received encoding parameters based on the particular plurality of output quality scores by:

determining that a subset of quality scores of the plurality of quality scores is above a threshold, wherein each respective quality score in the subset of quality scores corresponds to a respective encoding parameter in the subset of the plurality of encoding parameters.

19. The system of claim 12, wherein the control circuitry determines the subset of the plurality of received encoding parameters based on the particular plurality of output quality scores by, for each respective encoding parameter of the plurality of encoding parameters: determining that the respective output quality score corresponding to the encoding parameter is higher than an initial quality score, wherein the initial quality score is indicative of a quality of the particular video encoded with the respective encoding parameter.

20. The system of claim 12, wherein the particular video is a first segment of a full video.

* * * * *